(12) United States Patent
Nada et al.

(10) Patent No.: US 9,630,256 B2
(45) Date of Patent: Apr. 25, 2017

(54) CUTTING INSERT

(75) Inventors: Yutaka Nada, Joso (JP); Osamu Ichinoseki, Joso (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 140 days.

(21) Appl. No.: 13/885,209

(22) PCT Filed: Nov. 15, 2011

(86) PCT No.: PCT/JP2011/076274
§ 371 (c)(1),
(2), (4) Date: May 14, 2013

(87) PCT Pub. No.: WO2012/067103
PCT Pub. Date: May 24, 2012

(65) Prior Publication Data
US 2013/0236257 A1  Sep. 12, 2013

(30) Foreign Application Priority Data

Nov. 15, 2010 (JP) .................................. 2010-255000
Nov. 10, 2011 (JP) .................................. 2011-246398

(51) Int. Cl.
*B23B 27/16* (2006.01)
*B23B 27/14* (2006.01)

(52) U.S. Cl.
CPC ........ *B23B 27/1607* (2013.01); *B23B 27/141* (2013.01); *B23B 2200/0447* (2013.01);
(Continued)

(58) Field of Classification Search
CPC .............. B23B 27/141; B23B 27/1607; B23B 2200/0447; B23B 2200/081; B23B 2200/201
(Continued)

(56) References Cited

U.S. PATENT DOCUMENTS 3,407,467 A * 10/1968 Wirfelt .......................... 407/114
5,044,839 A * 9/1991 Takahashi ..................... 407/114
(Continued)

FOREIGN PATENT DOCUMENTS

CN           1615196 A        5/2005
CN        101031378 A         9/2007
(Continued)

OTHER PUBLICATIONS

Supplementary European Search Report dated Mar. 18, 2014, issued for the European Patent Application No. 11842433.2.
(Continued)

*Primary Examiner* — Sara Addisu
(74) *Attorney, Agent, or Firm* — Locke Lord LLP

(57) ABSTRACT

The present invention relates to a cutting insert having a cutting edge which is provided with a corner section that forms a convex arc shape when seen in a planar view from the direction facing the rake face and a pair of linear sections that are in contact with the corner section at the both ends thereof. The cutting edge is provided with a first region along the corner section, a second region along the linear section and a third region positioned between them, and a cross-sectional area of the insert main body on a cross-section orthogonal to the cutting edge in a range of width which is a radius R (mm) of the corner section is made largest in the third region, smallest in second region and between them in the first region in terms of size.

6 Claims, 8 Drawing Sheets

(52) U.S. Cl.
CPC ... *B23B 2200/081* (2013.01); *B23B 2200/201* (2013.01); *Y10T 407/235* (2015.01)

(58) Field of Classification Search
USPC .................................................. 407/113–116
See application file for complete search history.

(56) References Cited

U.S. PATENT DOCUMENTS

| | | | |
|---|---|---|---|
| 5,122,017 A * | 6/1992 | Niebauer ...................... | 407/114 |
| 5,577,867 A * | 11/1996 | Paya .............................. | 407/114 |
| 5,743,681 A * | 4/1998 | Wiman et al. ................. | 407/114 |
| 5,947,651 A * | 9/1999 | Murakami et al. ........... | 407/114 |
| 6,065,907 A | 5/2000 | Ghosh et al. | |
| 6,599,061 B1 * | 7/2003 | Nelson .......................... | 407/114 |
| 7,341,408 B2 * | 3/2008 | Kratz ............................ | 407/113 |
| 7,438,508 B2 * | 10/2008 | Alm et al. ..................... | 407/113 |
| 7,524,148 B2 * | 4/2009 | Okita et al. ................... | 407/114 |
| 7,976,251 B2 * | 7/2011 | Iyori et al. .................... | 407/114 |
| 8,251,618 B2 * | 8/2012 | Kobayashi .................... | 407/115 |
| 8,777,525 B2 * | 7/2014 | Lof ............................... | 407/114 |
| 8,814,480 B2 * | 8/2014 | Cohen .......................... | 407/113 |
| 2005/0019111 A1 | 1/2005 | Kitagawa et al. | |
| 2008/0199263 A1 * | 8/2008 | Jonsson et al. ................ | 407/11 |
| 2011/0070039 A1 * | 3/2011 | Park et al. .................... | 407/113 |
| 2012/0087751 A1 * | 4/2012 | Yamaguchi ................... | 407/115 |

FOREIGN PATENT DOCUMENTS

| | | |
|---|---|---|
| CN | 101259541 A | 9/2008 |
| JP | 08-108310 A | 4/1996 |
| JP | 09-038808 A | 2/1997 |
| JP | 2001-038507 A | 2/2001 |
| JP | 2001-047306 A | 2/2001 |
| JP | 2002-254214 A | 9/2002 |
| JP | 2004-216510 A | 8/2004 |
| JP | 2009-066726 A | 4/2009 |
| WO | WO-2011/038433 A1 | 4/2011 |

OTHER PUBLICATIONS

Office Action mailed Oct. 10, 2014, issued for the Chinese patent application No. 201180054762.4 and English translation of a part of the Search Report.
International Search Report dated Jan. 17, 2012, issued for PCT/JP2011/076274 and English translation thereof.
Office Action mailed on May 19, 2015 issued for corresponding Japanese Patent Application No. 2011-246398.

* cited by examiner

CUTTING INSERT

TECHNICAL FIELD

The present invention relates to a cutting insert which is appropriately used in medium cutting for cutting a difficult-to-cut material such as stainless steel by turning.

Priority is claimed on Japanese Patent Application No. 2010-255000 filed on Nov. 15, 2010, and Japanese Patent Application No. 2011-246398 filed on Nov. 10, 2011, the content of which is incorporated herein by reference.

BACKGROUND ART

As a cutting insert which is appropriately used in cutting stainless steel, Patent Document 1 proposes a cutting insert in which a breaker flute is formed so as to form a cross-sectional shape constituted with a land (rake angle θ1), a first inclination face (rake angle θ2), a second inclination face (rake angle θ3) and a steep face, each of which has a positive rake angle, sequentially from the cutting edge to a center thereof, thereby giving the relationship of θ2>θ1>θ3>0.

Further, Patent Document 2 proposes a cutting insert in which, for the purpose of treating chips in particular on high-feed rate medium cutting with low depth of cut, a first rake face inclined downward from a cutting edge and a second rake face inclined to a greater extent than the first rake face are continuously formed, a breaker is installed which rises on an upper face in the vicinity of a nose portion, an auxiliary protrusion having an angular shape is also installed from the first rake face in the vicinity of the nose portion to the breaker, and an inclination angle θ of a ridge line of the auxiliary protrusion, an inclination angle θ1 of the first rake face and an inclination angle θ2 of the second rake face 13 satisfy a relationship of θ1<θ<θ2.

PRIOR ART DOCUMENTS

Patent Documents

Patent Document 1: Japanese Published Unexamined Patent Application No. 2001-38507
Patent Document 2: Japanese Published Unexamined Patent Application No. 2001-47306

SUMMARY OF THE INVENTION

Problems to be Solved by the Invention

Stainless steel is low in heat conductivity and this is a reason why it is difficult to cut, as described in Patent Document 1. When such stainless steel is subjected to medium cutting, cutting heat which would be otherwise eliminated together with chips remains on the cutting insert and concentrates in the vicinity of the cutting edge. Thereby, a point of the cutting edge is heated at a high temperature to undergo plastic deformation and what is called die wear takes place. Next, when the plastic deformation occurs at a part which extends from a corner section of the cutting edge opposite of a feed direction, it is impossible to cut a workpiece to a predetermined outer diameter by turning, thus resulting in a failure of carrying out continuous cutting.

The present invention has been made in view of the above situation, an object of which is to provide a cutting insert which is capable of preventing plastic deformation which occurs at a part extending from a corner section of, in particular, the above-described cutting edge to the side opposite of a feed direction on medium cutting of a difficult-to-cut material such as stainless steel by turning, thereby carrying out cutting efficiently at high accuracy over a longer period of time.

Means for Solving the Problems

The cutting insert of the present invention is provided with an insert main body which has a rake face and a flank face, and a cutting edge which is formed at a ridge section between the rake face and the flank face in the insert main body. The cutting edge is provided with a corner section which forms a convex arc shape when seen in a planar view from the direction facing the rake face and a pair of linear sections which are in contact with the corner section at both ends of the corner section and extend linearly.

The insert main body is formed symmetrical with respect to a bisector of the corner section when seen in the planar view.

Further, the cutting edge is provided with a first region along the corner section, a second region along the linear section and a third region positioned between the first region and the second region, when seen in the planar view.

A cross-sectional area of the insert main body on a cross-section orthogonal to the cutting edge in a range of width which is a radius R (mm) of the corner section perpendicular to the cutting edge toward the inside of the rake face when seen in the planar view is largest in the third region and smallest in the second region, of the first, the second and the third regions. A cross-sectional area of the insert main body in the first region is between the largest cross-sectional area in the third region and the smallest cross-sectional area in the second region in terms of size. That is, the cross-sectional area in first region is smaller than that in the third region but larger than that in the second region.

In the above-constituted cutting insert, the third region of the cutting edge can be disposed in a range including a site corresponding to a border section between a turning trace formed earlier on an outer circumference face of a workpiece when the cutting insert is fed out while the workpiece is turned once and a turning trace formed after the workpiece has been turned once, that is, what is called a feed mark, at a part extending to the side opposite to a direction at which the cutting edge is fed from the corner section on medium cutting by a turning process. Thus, it is possible to cut the workpiece by using the cutting edge from the third region toward the feed direction up to the linear section positioned in the feed direction after the corner section.

On medium cutting which is carried out in general under conditions that the depth of cut is 1.5 mm to 4.0 mm and the feed rate is 0.2 mm/rev to 0.5 mm/rev, the third region of the cutting edge is to be more reliably disposed in a range including the border section. Therefore, it is acceptable that a border between the third region and the first region be positioned in a range of R+0.1 (mm) to R+0.3 (mm) with respect to a radius R (mm) of the corner section from a tangent line which is orthogonal to an extension line of the linear section to the corner section and in contact with the corner section, along the extension line. It is also acceptable that a border between the second region and the third region be positioned in a range of r+0.6 (mm) with respect to a nominal radius r (mm) of the corner section from the tangent line which is orthogonal to the extension line of the linear section to the corner section and in contact with the corner section, along the extension line. Further, it is acceptable that the border between the third region and the first region be positioned at R+0.1 (mm) with respect to an actually measured radius R (mm) of the corner section from the tangent line which is orthogonal to the extension line of the linear section to the corner section and in contact with the corner section, along the extension line, and the border between the second region and the third region be positioned at r+0.3 (mm) with respect to the nominal radius r (mm) of the corner section from the tangent line, along the extension line.

Here, the border between the third region and the first region is at a position where the above-described cross-sectional area starts to decrease toward the first region and the border between the second region and the third region is at a position where the above-described cross-sectional area starts to increase from the second region toward the third region.

Therefore, at a part of the cutting edge which extends to the side opposite to a feed direction from the corner section of the cutting edge to finish an outer circumference face of a workpiece, cutting heat concentrates in the first region along the corner section from the third region and plastic deformation is caused. However, in the above-constituted cutting insert, of the first region, the second region and the third region, the above-described cross-sectional area in the third region is largest and the cross-sectional area in the first region is second largest. It is thus possible to ensure heat capacity of the insert main body at a part at which the cutting heat concentrates to a greater extent than that in the second region along the linear section. As a result, despite concentration of the cutting heat, it is possible to prevent a point of the cutting edge from being a high temperature and also prevent the point of the cutting edge from undergoing die wear due to plastic deformation.

Here, as described above, in order to make larger a cross-sectional area orthogonal to the cutting edge when seen in the planar view in the third region than that in the first region or in the second region, for example, as with the cutting insert described in Patent Documents 1, 2, it is acceptable that an inclination face which is inclined toward a face on a side opposite to the rake face of the insert main body with moving toward the inside of the rake face from the cutting edge on a cross-section orthogonal to the cutting edge be formed on the rake face from the first region, the second region to the third region, and an inclination angle of the inclination face be smaller in the third region than an inclination angle of at least in one of the first region and the second region. It is also acceptable that a width of the inclination face in the third region be larger than a width of at least in one of the first region and the second region in a direction perpendicular to the cutting edge when seen in the planar view. Alternatively, the inclination face may be decreased in inclination angle and increased in width when seen in the planar view.

Incidentally, in order to ensure a great heat capacity of the insert main body in the vicinity of the cutting edge at which the cutting heat concentrates for merely preventing plastic deformation, it is acceptable that the inclination face be decreased in inclination angle or increased in width all over in the first region, the second region and the third region to increase a cross-sectional area. However, the cross-sectional area is increased to result in an increase in cutting force in the second region along the linear section of the cutting edge which is located in a feed direction and cuts into a workpiece in medium depth of cut. Thus, there are concerns that the vicinity of the cutting edge may be heated at a high temperature by the cutting heat or greater electric power may be required for rotating the workpiece.

Where a cutting insert for medium cutting is used to cut a workpiece, for example, by copy turning, there may be such a mode that a corner section of the cutting edge is exclusively used for cutting. At such times, where an inclination face is small in inclination angle or large in width in the first region along the corner section, it may be impossible to reliably treat chips generated as narrow.

Therefore, in the present invention, of the first region, the second region and the third region, as described above, in medium-cutting turning, the above-described cross-sectional area in the third region where a border section of turning trace is located is made largest and the above-described cross-sectional area in the second region is made smallest. Next, in the first region along the corner section which is constantly used for cutting, the cross-sectional area is made smaller than that in the third region but larger than that in the second region.

In order to treat more reliably narrow chips which are generated at the corner section in the above-described copy turning, it is acceptable that a recessed portion be formed inside the first region when seen in the planar view so as to dent with respect to the rake face communicating with the cutting edge in the first region and the third region, and a bottom face of the recessed portion be formed in a raised V-letter shape having on a cross-section orthogonal to a bisector of the corner section when seen in the planar view a ridge section on the bisector. Thereby, the chips are guided into the recessed portion and allowed to come into contact in a sliding manner with a raised V-letter shape ridge section formed by the bottom face, thereby giving resistance to the chips, and the chips are cut off.

Effects of the Invention

As described so far, according to the present invention, on medium cutting of a difficult-to-cut material such as stainless steel, despite concentration of cutting heat in the vicinity of the cutting edge, it is possible to prevent in advance such a situation that a point of the cutting edge undergoes plastic deformation to cause die wear, thus resulting in failure of turning without having an increase in cutting force or an increase in electric power for rotating and driving a workpiece. It is therefore possible to effectively carry out cutting stably at high accuracy over a longer period of time.

BEST MODE FOR CARRYING OUT THE INVENTION

Figure 1:
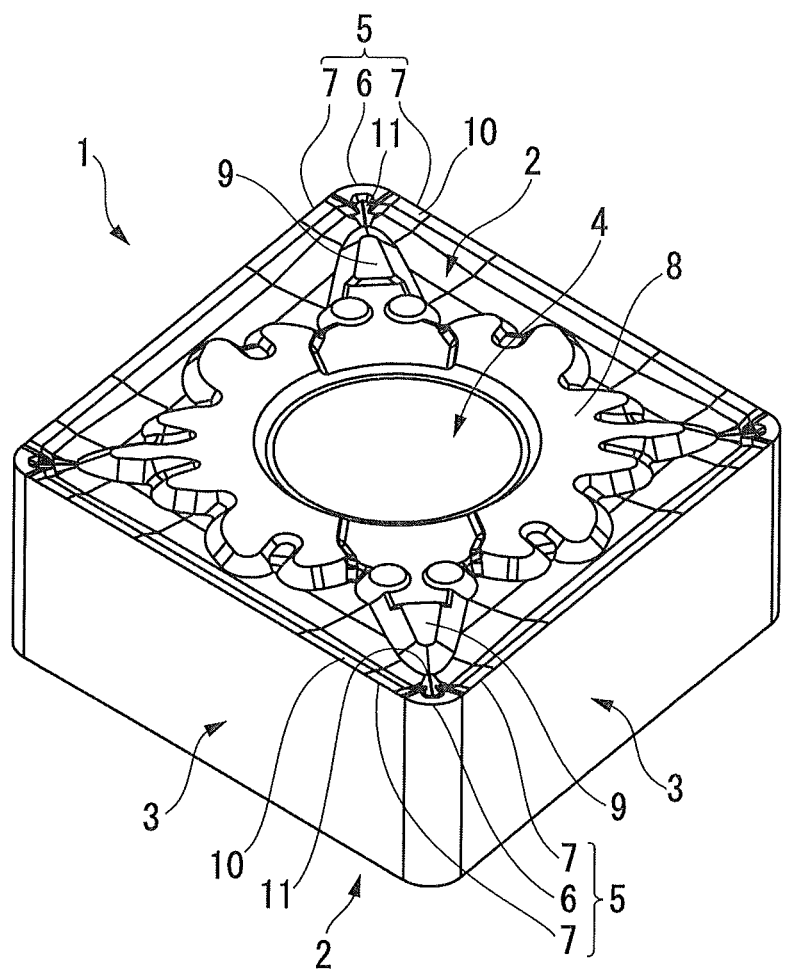
FIG. 1 is a perspective view which shows one embodiment of the present invention.
Figure 2:
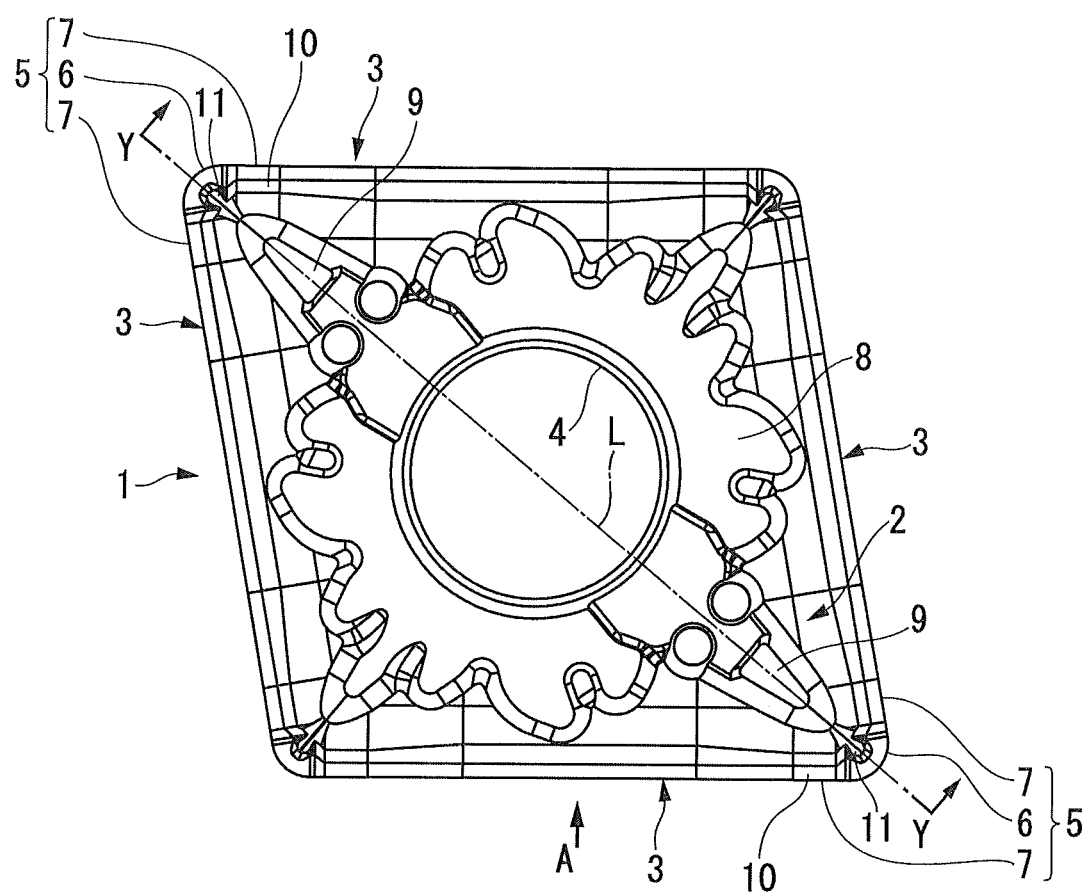
FIG. 2 is a planar view which shows the embodiment shown in FIG. 1 when seen from a direction facing a rake face.

One embodiment of the present invention is shown in FIG. 1 to FIG. 13. In the present embodiment, an insert main body 1 is formed as a flat polygonal plate with a hard material such as a sintered hard alloy, a pair of polygonal faces is given as rake faces 2, and side faces installed around the rake face 2 are given as flank faces 3. Further, an attachment hole 4 for attaching the insert main body 1 to a holder of a throw-away type tool is opened at the center of the rake face 2 so as to go through the insert main body 1 in the thickness direction thereof (in a vertical direction in FIG. 3, FIG. 4, FIG. 6 to FIG. 13). In addition, a metal oxide layer such as $Al_2O_3$ or a carbon-nitride layer such as TiCN may be coated on the surface of the insert main body 1 in a singular or a multi-layered form. It is also possible to coat a diamond layer thereon.

Figure 3:
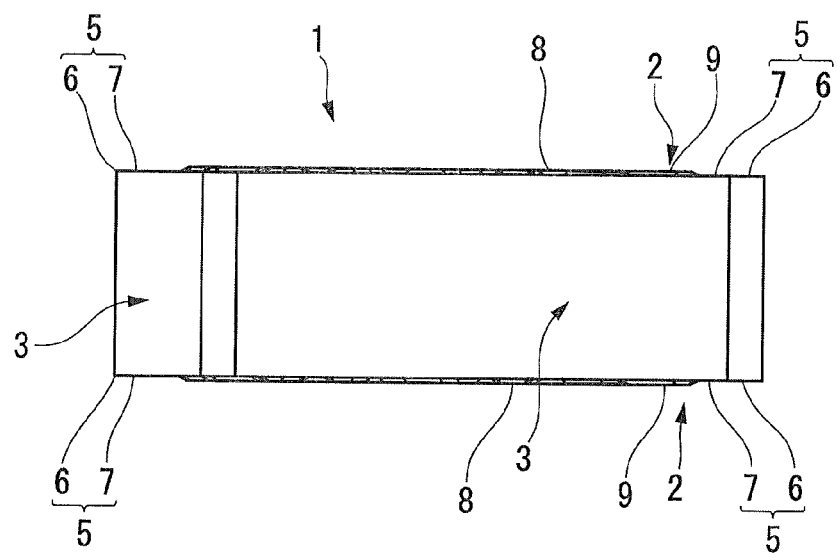
FIG. 3 is a side view when seen in a direction of A in FIG. 2.
Figure 4:
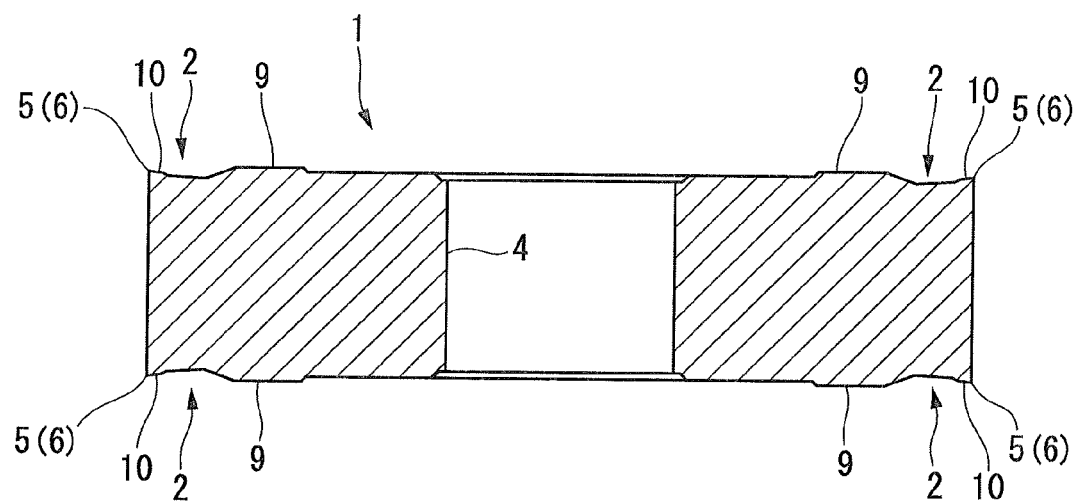
FIG. 4 is a sectional view taken along a line of Y to Y in FIG. 2.

Further, a ridge section between adjacent flank faces 3 is formed as a raised cylindrical face which is smoothly in contact with the flank faces 3 and a cutting edge 5 is formed at a ridge section between the flank faces 3 and the rake face 2. Therefore, the cutting edge 5 is provided with a corner section 6 which forms a convex arc shape at a ridge section between the adjacent flank faces 3 when seen in a planar view from the thickness direction facing the rake face 2 and also provided with a pair of linear sections 7 which are in contact with the corner section 6 at both ends of the corner section 6 and extend linearly. Further, the cutting edge 5 is formed so as to extend on one flat plane perpendicular to the thickness direction with respect to each of the pair of rake faces 2 in the thickness direction as shown in FIG. 3.

Figure 5:
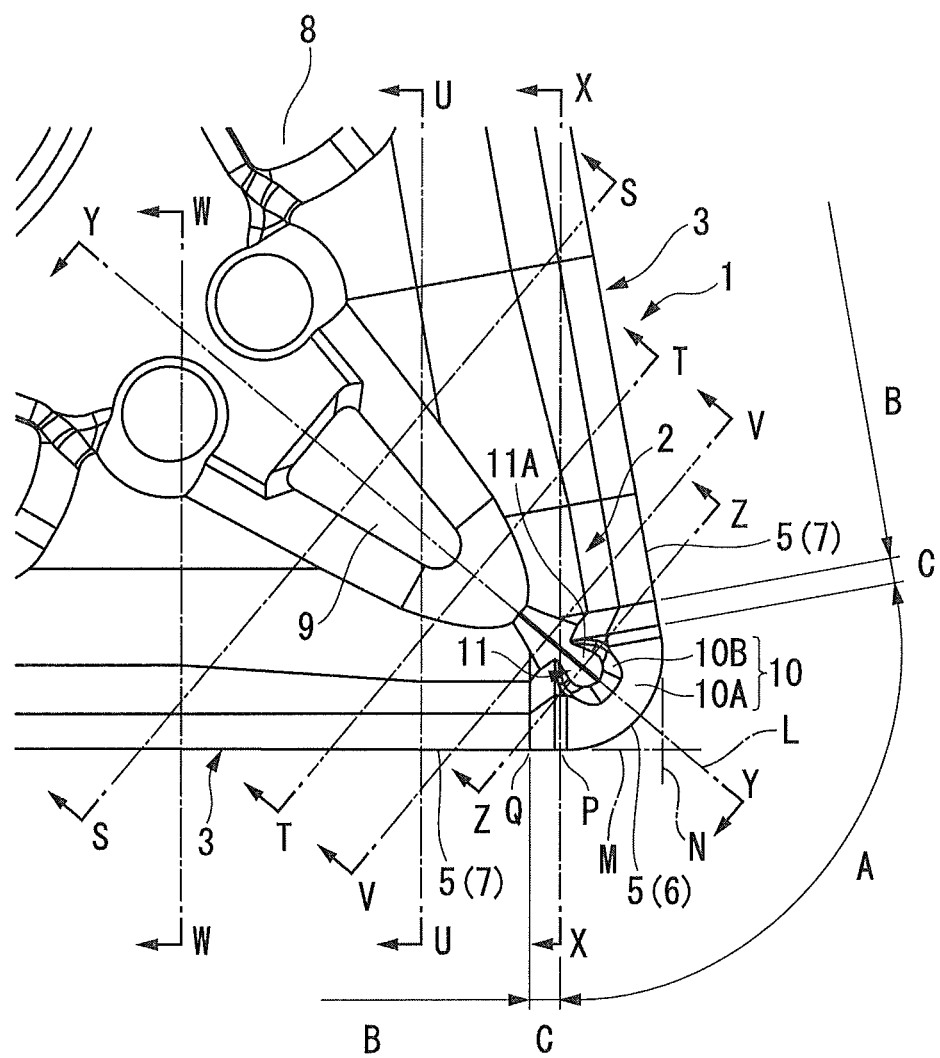
FIG. 5 is an enlarged planar view which shows the vicinity of a corner section of a cutting edge of the embodiment shown in FIG. 1 when seen from a direction facing the rake face.

Here, the insert main body 1 of the present embodiment is formed as a flat rhomboid plate and a pair of rhomboid faces are given as the rake faces 2. Therefore, the corner section 6 of the cutting edge 5 is such that the one formed at a rhomboid acute-angled corner and the one formed at a rhomboid obtuse-angled corner by the rake face 2 are alternately placed in a circumferential direction. In the thus constituted cutting insert, as shown in FIG. 5, the corner section 6 formed at an acute-angled corner and the linear sections 7 communicating therewith are mainly used to cut a workpiece by turning. However, in a flat square cutting insert, it is possible to use corner sections formed at four right angle corners and linear sections continuous thereto.

In addition, a boss portion 8 is formed so as to rise toward the thickness direction from the rake face 2 on both sides of a diagonal line connecting the rhomboid acute-angled corners formed by the rake face 2, that is, on both sides of a bisector L of the corner section 6 on the acute-angled corner around an opening of the attachment hole 4 at the center of the rake face 2. Here, an upper face of the boss portion 8 is at a position slightly protruding from the flat plane at which the cutting edge 5 is positioned on each of the rake faces 2 and given as a flat plane perpendicular to the thickness direction.

Further, a protrusion streak 9 is formed so as to rise from the rake face 2 also from the boss portion 8 to the acute-angled corner along the bisector L and an upper face of the protrusion streak 9 is also at the same position as the upper face of the boss portion 8 in the thickness direction and given as a flat plane perpendicular to the thickness direction. Further, the protrusion streak 9 is formed so as to decrease in width with moving toward the acute-angled corner when seen in the planar view, and the side faces of the protrusion streak 9 and the boss portion 8 are given as inclination faces which become wider toward the rake face 2 from the respective upper faces. Further, in the present embodiment, the insert main body 1 is made symmetrical with respect to the bisector L when seen in the planar view and also symmetrical in the thickness direction and therefore the insert main body 1 has a shape of front/back-sides-reversal symmetric.

Further, at a peripheral part of the rake face 2 communicating with the cutting edge 5, an inclination face 10 is formed which is inclined to the rake face 2 on the opposite side with moving toward the inside of each of the rake faces 2 both from the corner section 6 and the linear section 7. Here, in the present embodiment, the inclination face 10 is formed with a first inclination face 10A which is inclined to the rake face 2 on the opposite side at an inclination angle α shallow with respect to the flat plane at which the cutting edge 5 is positioned and a second inclination face 10B which is inclined at inclination angle β steeper than the first inclination face 10A sequentially from the side of the cutting edge 5. Still further, these inclination angles α, β are to be both constant on a cross-section orthogonal to the cutting edge 5.

On the other hand, toward a direction at which the cutting edge 5 extends from the corner section 6 to the linear section 7, the inclination face 10 is to have the inclination angles α, β which are mutually different in angle or the inclination face 10 is dimensionally different in width in a direction perpendicular to the cutting edge 5 when seen in the planar view. Thereby, in the cutting edge 5, as shown in FIG. 5 when seen in the planar view, on the assumption that a part which runs at least along the corner section 6 is given as a first region A, a part which runs at least along the linear section 7 is given as a second region B, and a part positioned between the first region A and the second region B is given as a third region C, a cross-sectional area of the insert main body 1 on a cross-section orthogonal to the cutting edge 5 in a range of width which is a radius R (mm) of the corner section 6 from the cutting edge 5 perpendicularly to the inside of the rake face 2 when seen in the planar view is made largest in the third region C, of the first region A, the second region B and the third region C, made smallest in the second region B and dimensionally between the largest cross-sectional area in the third region C and the smallest cross-sectional area in the second region B in the first region A. That is, the cross-sectional area in the first region A is smaller than that in third region C but larger than that in the second region B.

Figure 6:
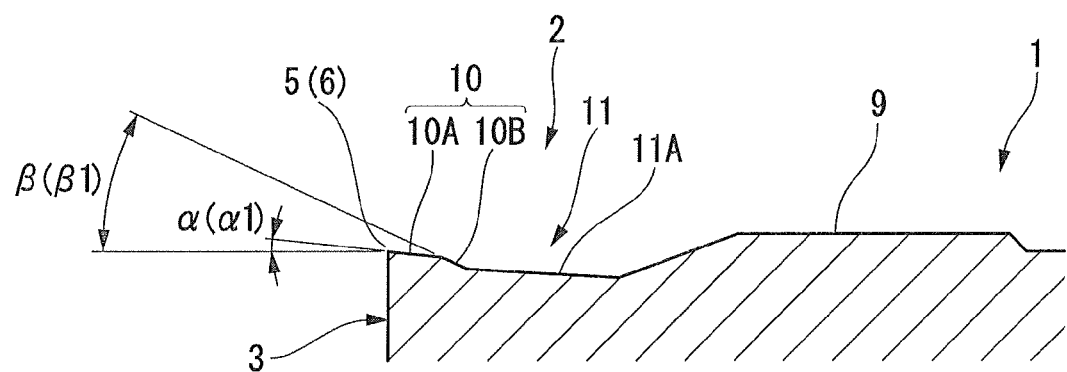
FIG. 6 is a sectional view taken along a line of Y to Y in FIG. 5 (a sectional view orthogonal to a cutting edge 5 in a first region A).
Figure 7:
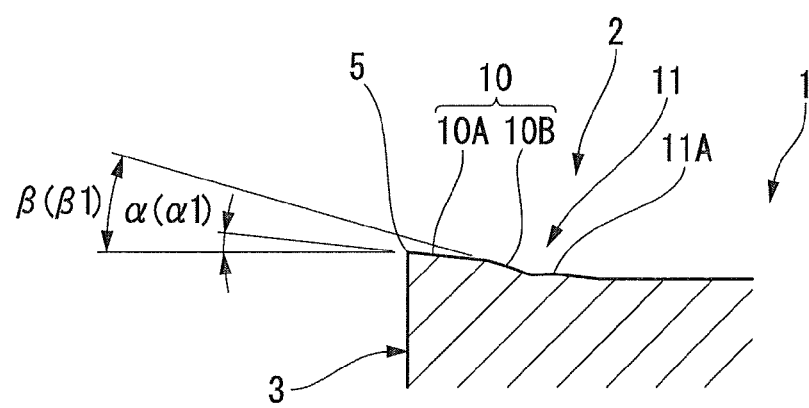
FIG. 7 is a sectional view taken along a line of X to X in FIG. 5 (a sectional view orthogonal to the cutting edge 5 in a third region C).

Here, in the present embodiment, of these regions, in the third region C, the inclination angles α, β of the inclination face 10 are, as shown in FIG. 7, given as small inclination angles α1, β1. Further, the width of the inclination face 10 is, as shown in FIG. 5, to be greater than that in the first region A and that in the second region B. Still further, as shown in FIG. 6, the inclination angles α, β in the first region A are given as small inclination angles α1, β1 which are equal to those in third region C, while the width of the inclination face 10 is made smaller than that in the third region C.

Figure 8:
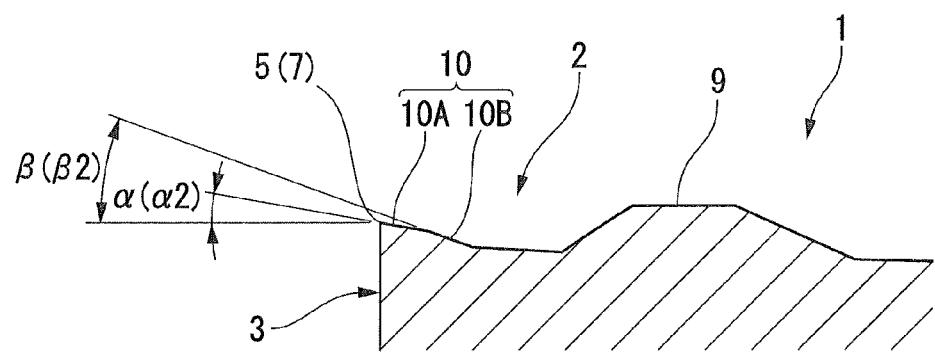
FIG. 8 is a sectional view taken along a line of U to U in FIG. 5 (a sectional view orthogonal to the cutting edge 5 in a second region B).
Figure 9:
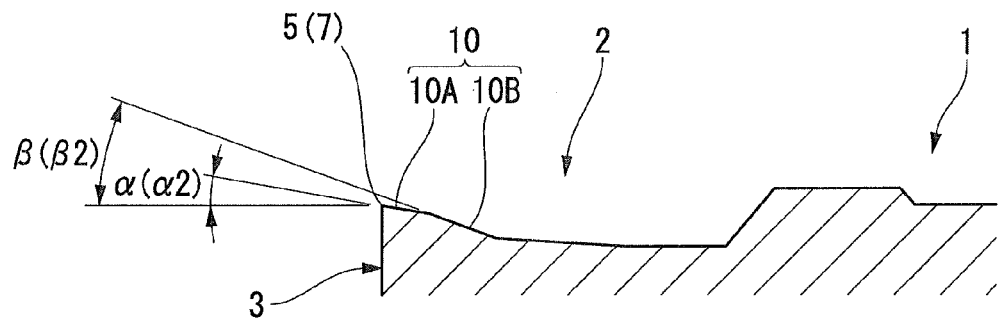
FIG. 9 is a sectional view taken along a line of W to W in FIG. 5.

Further, in the second region B, as shown in FIG. 8, the inclination angles α, β of the inclination face 10 are given as inclination angles α2, β2 which are greater than the inclination angles α1, β1 in the first region A and the third region C, and the width of the inclination face 10 is made smaller than that in the third region C. Thereby, as described above, the cross-sectional area is made largest in the third region C, smallest in the second region B and dimensionally between them in the first region.

Still further, of these regions, in the third region C, a border P between the first region A and the third region C and a border Q between the second region B and the third region C are in the present embodiment, as shown in FIG. 5, positioned in a range of R+0.1 (mm) to r+0.3 (mm) with respect to an actually measured radius R (mm) of the corner section 6 and a nominal radius r (mm) of the corner section 6 when seen in the planar view from a tangent line N which is orthogonal to an extension line M of the linear section 7 of the cutting edge 5 to the corner section 6 and in contact with the corner section 6, along the extension line M. It is, however, acceptable that the border P between the third region C and the first region A be positioned in a range of R+0.1 (mm) to R+0.3 (mm) with respect to the actually measured radius R (mm) from the tangent line N, along the extension line M, and the border Q between the second region B and the third region C be positioned in a range of r+0.6 (mm) with respect to the nominal radius r (mm) from the tangent line N, along the extension line M. It is also acceptable that the border P be positioned at R+0.1 (mm) with respect to the actually measured radius R (mm) from the tangent line N, along the extension line M and the border Q be positioned at r+0.3 (mm) with respect to the nominal radius r (mm) from the tangent line N, along the extension line M. It is therefore acceptable that the third region C be given as a region including a contact point between the corner section 6 of the cutting edge 5 and the linear section 7 thereof by a corner angle formed by the pair of linear sections 7 and the third region C as a whole be positioned at the linear section 7.

The inside of the rake face 2 in the third region C which is further inside than the inclination face 10 is given as a flat plane parallel to the flat plane at which the cutting edge 5 is positioned. In contrast, the inside of the rake face 2 in the second region B which is further inside than the inclination face 10 is given as an inclination face which moves toward the rake face 2 on the opposite side of the insert main body 1 at an extremely shallow inclination with moving toward the inside of the rake face 2. Thereby, the cross-sectional area in the second region B is also made small.

Further, at a part which moves toward the adjacent second region B in the third region C, the inclination face 10 is gradually decreased in inclination angles α, β and gradually increased in width with being spaced away from the second region B. On the other hand, in the second region B which is adjacent to this part, the inclination angles α2, β2 of the inclination face 10 and the width thereof are to be constant in a predetermined range along the cutting edge 5, and the cross-sectional area is made smallest at this part. Here, in the present embodiment, the border Q between the third region C and the second region B is a position from a part where the cross-sectional area in the second region B is made smallest to a part where the inclination angles α, β of the inclination face 10 start to decrease and the width thereof starts to increase in the third region C.

On the other hand, inside the first region A, a recessed portion 11 is formed in which the inclination face 10 having the inclination angles α1, β1 equal to those in the third region C dents in the thickness direction so as to form a C-letter shape or a U-letter shape when seen in the planar view on the way to the first inclination face 10A. Thereby, the width of the inclination face 10 in the first region A is made smaller than that in the third region C and the cross-sectional area is also made smaller. Here, in the present embodiment, the border P between the third region C and the first region A is at a position where the cross-sectional area starts to decrease from the third region C to the first region A due to the recessed portion 11.

Figure 10:
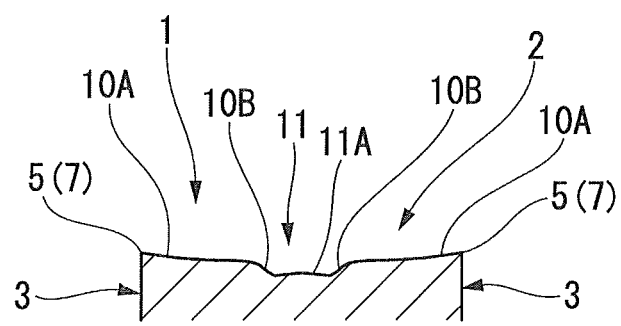
FIG. 10 is a sectional view taken along a line of Z to Z in FIG. 5.
Figure 11:
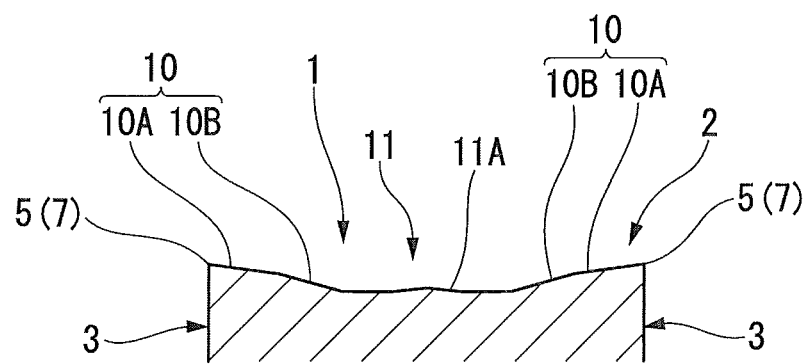
FIG. 11 is a sectional view taken along a line of V to V in FIG. 5.
Figure 12:
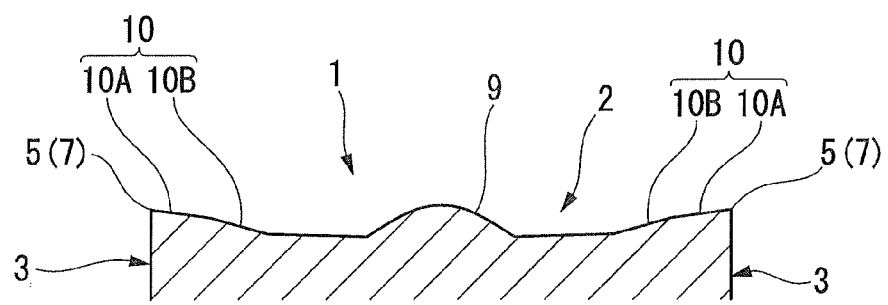
FIG. 12 is a sectional view taken along a line of T to T in FIG. 5.
Figure 13:
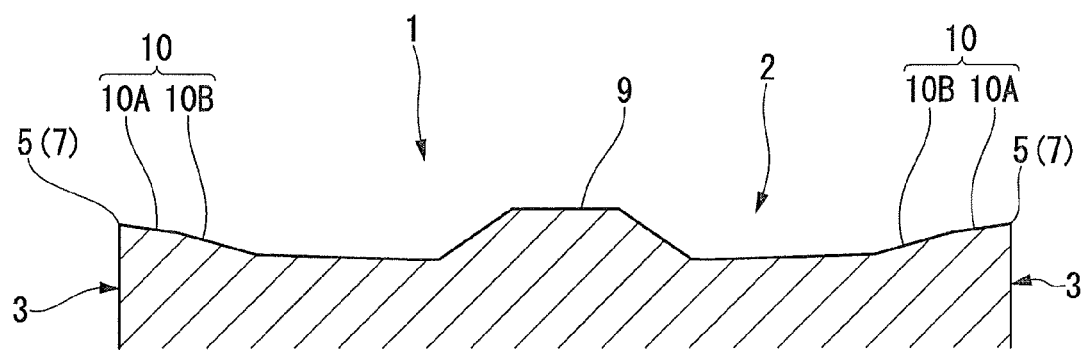
FIG. 13 is a sectional view taken along a line of S to S in FIG. 5.

Further, a bottom face 11A of the recessed portion 11 is formed in a raised V-letter shape which is made flat in the thickness direction and which has a ridge section on the bisector L at a cross-section orthogonal to the bisector L as shown in FIG. 10 or FIG. 11. However, the raised V-letter shaped ridge section is at a position which dents in the thickness direction to a greater extent than the first inclination face 10A of the inclination face 10 in the first region A, the second region B and the third region C. And the bottom face 11A of the recessed portion 11 which forms the raised V-letter shape goes beyond the center of a convex arc formed by the corner section 6 when seen in the planar view and reaches the leading end of the protrusion streak 9.

In a turning process using the thus constituted cutting insert, a part of the cutting edge 5 extending from the corner section 6 which has cut into a workpiece to the side opposite of a feed direction of the corner section 6 finishes an outer circumference face of the workpiece. Where the workpiece is subjected to medium cutting in general under conditions that the depth of cut is 1.5 mm to 4.0 mm and the feed rate is 0.2 mm/rev to 0.5 mm/rev, in the cutting edge 5 which finishes the outer circumference face, a border section between a turning trace made by the cutting edge 5 which has finished earlier, an outer circumference face of the workpiece and a turning trace made after the workpiece has been turned once, that is, what is called a feed mark, is substantially positioned in a range of R+0.1 (mm) to r+0.3 (mm) with respect to an actually measured radius R (mm) of the corner section 6 and a nominal radius r (mm) of the corner section 6 from a tangent line N which is orthogonal to an extension line M of the linear section 7 to the corner section 6 and in contact with the corner section 6 from the feed direction to the linear section 7, along the extension line M.

Therefore, in the cutting edge 5, a part which covers a length from the border section through the leading end of depth of cut of the corner section 6 toward a feed direction to the depth of cut thereof, which is from the leading end to the base end of depth of cut, is used in carrying out medium cutting. Next, in the above constituted cutting insert, the third region C of the cutting edge 5 is positioned in the range from the tangent line N, along the extension line M, and a cross-sectional area in the third region C on a cross-section which is orthogonal to the cutting edge 5 in a range of radius R (mm) of the corner section 6 from the cutting edge 5 when seen in the planar view is made largest and a cross-sectional area in the first region A along the corner section 6 is made larger than that in the second region B.

As a result, the first region A and the third region C are also increased in volume of the insert main body 1 more than the second region B and therefore able to ensure a greater heat capacity than the second region B. Thus, even if cutting heat concentrates in the vicinity of the cutting edge 5 of the insert main body 1 on a turning process of a difficult-to-cut material such as stainless steel, it is possible to avoid such a situation that a point of the cutting edge is heated at a high temperature to cause plastic deformation. In particular, the cutting edge 5 from the border section to the leading end of depth of cut which finishes an outer circumference face of a workpiece is constituted with the first region A and the third region C. It is therefore possible to prevent in advance such a situation that the point of the cutting edge undergoes die wear due to the plastic deformation and fails in cutting the workpiece to a predetermined outer diameter by turning. Thereby, it is possible to carry out a turning process stably at high accuracy over a longer period of time.

On the other hand, in the present embodiment, in the first region A, the second region B and the third region C, the rake face 2 communicating with the cutting edge 5 is given as an inclination face 10. The third region C is decreased in inclination angles α1, β1 but increased in width to a greater extent than the second region B as seen in the planar view, thereby providing the greater cross-sectional area. However, in the second region B of the cutting edge 5 along the linear section 7, adversely the inclination face 10 is increased in inclination angles α2, β2 and decreased in width. Therefore, chips are pressed to the inclination face 10 at the linear section 7 which is faced in a feed direction to cut into a workpiece more than is necessary and also for a longer period of time, thus it is not result in an increase in cutting force.

Then, only for the purpose of preventing plastic deformation caused by concentration of cutting heat, it will be sufficient that all over the cutting edge 5 including the second region B, the inclination face 10 is decreased in inclination angles α, β and increased in width to enlarge the cross-sectional area, thereby ensuring a greater heat capacity of the insert main body 1 in the vicinity of the cutting edge 5. However, the above constitution will increase the cutting force and increase the electric power for rotating a workpiece. On the other hand, in the above-constituted cutting insert, in the second region B along the linear section 7, as described above, the inclination face 10 is increased in inclination angles α2, β2 and decreased in width, thus making it possible to prevent an increase in cutting force as described above, although the cross-sectional area is decreased. That is, according to the above-described cutting insert, it is possible to carry out the above-described stable and high-accuracy turning process efficiently and economically.

Further, in the above-constituted cutting insert, in the first region A as well, the inclination face 10 is equal in inclination angles α1, β1 to that in the third region C but decreased in width to a smaller extent than that in the third region C, by which the above-described cross-sectional area is larger than that in second region B but smaller than that in the third region C. Thereby, it is possible to suppress an increase in cutting force, with the cross-sectional area and heat capacity being ensured. Still further, where a workpiece is subjected to copy turning even on medium cutting, there is a cutting mode close to light cutting in which the corner section 6 of the cutting edge 5 at which the first region A is located is used exclusively. In the above-described cutting mode, in the thus constituted cutting insert, the inclination face 10 in the first region A is decreased in width to a smaller extent than that in the third region C, thus making it possible to deliver smoothly generated narrow chips from the inclination face 10 to the inside of the rake face and treat the chips reliably.

Still further, in the present embodiment, the recessed portion 11 is formed inside the first region A of the cutting edge 5 along the corner section 6. The bottom face 11A of the recessed portion 11 is formed in a raised V-letter shape having a ridge section on the bisector L on a cross-section orthogonal to the bisector L. Therefore, in the above-described cutting mode, the narrow chips generated by the corner section 6 are smoothly guided into the recessed portion 11 together with the fact that the inclination face 10 is small in width and the chips flow stably in a certain direction. In addition, the bottom face 11A comes into contact with the raised V-letter shaped ridge section in a sliding manner to give resistance to the chips, by which the chips are cut off. Thus, the present embodiment is able to reliably treat the chips even in the above-described cutting mode.

In the present embodiment, as described above, inclination angles α, β of the inclination face 10 in the third region C are equal to those in the first region A and smaller than those in the second region. And the inclination face 10 is made larger in width when seen in the planar view than that in the first region A or the second region B. Thereby, the cross-sectional area is made largest. It is, however, acceptable that inclination angles α, β of the inclination face 10 in the third region C be made smaller than those in the first region A. It is also acceptable that, as described above, where the inclination angles α, β are made smaller in the third region C than those in the first region A, the inclination face 10 in the first region A be equal in width to that in the third region C and the cross-sectional area in the first region A be made largest.

Further, the inclination face 10 is constituted with two inclination faces, that is, the first and the second inclination faces 10A, 10B which have different inclination angles α, β. It is however acceptable that, for example, the first inclination face 10A in the first region A or the third region C be not given as an inclination face but the inclination angle α be set at 0°, that is, given as a flat plane along a flat plane perpendicular in the thickness direction at which the cutting edge 5 is located. It is also acceptable that the inclination face 10 be given as a single inclination face or constituted with an inclination face having three or more stages. Still further, it is acceptable that the cutting edge 5 be not necessarily located on a flat plane perpendicular in the thickness direction all over its circumference and, for example, the linear section 7 be inclined to the rake face 2 on the opposite side with being spaced away from the corner section 6.

Further, in the present embodiment, the insert main body 1 which is a flat plate is made symmetrical with respect to the bisector L when seen in the planar view, also symmetrical in the thickness direction and therefore the insert main body 1 has a shape of front/back-sides-reversal symmetric. Thus, if the size of the inclination angles α, β and the width on one side of the rake face 2 of the inclination face 10 is constituted as described above, the cross-sectional area of the insert main body 1 on a cross-section orthogonal to the cutting edge 5 in a range of width which is a radius R (mm) of the corner section 6 perpendicular to the cutting edge 5 to the inside of the rake face 2 when seen in the planar view is made largest in the third region C, second largest in the first region A and smallest in the second region B.

Even if the insert main body 1 does not have a shape of front/back-sides-reversal symmetric but if the insert main body 1 is such that the above-described rake face 2 is formed on the front side thereof and a flat plane perpendicular in the thickness direction is given on the back side thereof, the cross-sectional area of the insert main body 1 on a cross-section orthogonal to the cutting edge 5 in a range of width which is a radius R (mm) of the corner section 6 perpendicular to the cutting edge 5 toward the inside of the rake face 2 when seen in the planar view is made largest in the third region C, second largest in the first region A and smallest in the second region B.

EXAMPLE

Next, a range in which the third region C is positioned will be demonstrated for its effect by referring to an example. In the present example, four types of cutting inserts were manufactured according to the above-described embodiment which changed a range where the third region C was positioned in a direction from the tangent line N orthogonal to the extension line M of the linear section 7 to the corner section 6 and in contact with the corner section 6, along the extension line M. These cutting inserts are referred to as examples 1 to 4.

Further, in these cutting inserts of the examples 1 to 4, the model number was CNMG120408, the nominal radius r of the corner section 6 was 0.8 (mm) and the actually measured radius R was 0.794 (mm). Further, the insert main body 1 was made with a sintered hard alloy (type M20 according to JIS B 4053-1998), the surface of which was coated by a CVD method with about a 5-μm-thick composite layer prepared by coating $Al_2O_3$ on TiCN.

Further, in the first region A and the third region C, the inclination angle α1 of the first inclination face 10A was 6° and the inclination angle β1 of the second inclination face 10B was 16°. The inclination angle α2 of the first inclination face 10A in the second region B was 10° and the inclination angle β2 of the second inclination face 10B was 20°. When seen in the planar view, the width of the first inclination face 10A in the first region A was 0.3 mm and the width of the second inclination face 10B was 0.6 mm, a maximum width of the first inclination face 10A in the second region B was 0.3 mm and a maximum width of the second inclination face 10B was 0.7 mm. The width of the first inclination face 10A in the third region C was 0.5 mm and the width of the second inclination face 10B was 0.8 mm.

On the other hand, as a comparative example of these examples 1 to 4, a cutting insert in which an inclination face having the same the inclination face 10 in the second region B of each of the examples 1 to 4 was formed all over the cutting edge 5 was manufactured with the same material as that of each of the examples 1 to 4 and coated with the same composite layer.

Next, the cutting inserts of these examples 1 to 4 and the comparative example were used to give medium cutting to a workpiece of stainless steel by turning. Plastic deformation resistance and an increase in electric power for rotating the workpiece at that time were compared when each of the examples 1 to 4 was used and when the comparative example was used. The results and general evaluation are shown in Table 1, together with ranges of the examples 1 to 4 at which the third region C was positioned.

TABLE 1

| | Range of third region (mm) | Evaluation of plastic deformation force | Evaluation of electric power | General evaluation |
|---|---|---|---|---|
| Example 1 | 0.894 to 1.1 | EX | EX | EX |
| Example 2 | 0.894 to 1.4 | EX | EX | EX |
| Example 3 | 0.894 to 1.7 | EX | FA | FA |

TABLE 1-continued

| | Range of third region (mm) | Evaluation of plastic deformation force | Evaluation of electric power | General evaluation |
|---|---|---|---|---|
| Example 4 | 1.094 to 1.3 | EX | FA | FA |
| Comparative example | — | NB | EX | NB |

Further, the workpiece was a round bar made with SUS 304 (hardness of 169 HB), the diameter of which was 132.4 mm, and subjected to wet cutting by using cutting fluid (type A3 No. 1 according to JIS K 2241: 2000) under cutting conditions that the depth of cut was 4.0 mm, the feed rate was 0.3 mm/rev and the cutting speed was 150 m/min. An outer diameter of the workpiece was continuously cut over a length of 0.2 m in the rotation axis direction of the workpiece by turning.

The evaluation was made under the following criteria. Regarding the plastic deformation resistance, a case where no plastic deformation was found was evaluated "EX (excellent)" and a case where cutting was possible although plastic deformation was found was evaluated "FA (fair)" and a case where cutting was impossible due to plastic deformation was evaluated "NB (not bad)". Further, regarding the electric power, on the basis of the electric power for rotating the workpiece on cutting by the cutting insert of the comparative example, a case where an increase in electric power was 1% or less was evaluated "EX (excellent)", a case where the increase was in excess of 1% but less than 3% was evaluated "FA (fair)" and a case where the increase was 3% or more was evaluated "NB (not bad)". Next, overall evaluation was made on the basis of a lower evaluation result of the above-described results on the plastic deformation resistance and electric power.

With reference to the results given in Table 1, first, regarding the plastic deformation resistance, in the examples 1 to 4 of the present invention, no plastic deformation was found at all and medium cutting was able to be carried out stably at high accuracy. This is considered due to the fact that under the above-described cutting conditions, a border section at which the feed mark has been formed is positioned in a range of 1.094 mm to 1.1 mm and this is a range common to all the examples 1 to 4 where the third region C is positioned. In contrast, in the comparative example where the inclination face 10 of the rake face 2 communicating with the cutting edge 5 was set to be 10° in inclination angle α2 and 20° in inclination angle β1 all over the circumference as with the second region B, it was impossible to carry out cutting due to plastic deformation caused at a point of the cutting edge by cutting heat.

The comparative example in which the inclination face 10 was increased in inclination angles α, β all over the circumference thereof was smallest in electric power. Of the examples 1 to 4, each of the examples 1, 2 exhibited the result substantially similar to that of the comparative example. However, the example 1 and the example 2 were both increased in electric power by 1% or less as compared with the comparative example, and the example 1 was increased in electric power to a slightly lesser extent than example 2. From these results, it is apparent that the example 1 is more desirable in which the third region C is in a range of R+0.1 (mm) to r+0.3 (mm) with respect to an actually measured radius R (mm) of the corner section and a nominal radius r (mm) of the corner section 6 in a direction from a tangent line N which is orthogonal to an extension line M of the linear section 7 to the corner section 6 and in contact with the corner section 6, along the extension line M.

When comparison was made for the examples 1 to 3, each of which had the border P between the third region C and the first region A at the same position, the one smaller in range of the third region C was more likely to increase in electric power to a lesser extent. Further, when comparison was made for the example 1 and the example 4 in which the size of the range of the third region C was equal, the increase in electric power was low in the example 1 in which the border P between the first region A and the third region C was positioned closer to the corner section 6.

INDUSTRIAL APPLICABILITY

The present invention relates to a cutting insert which is provided with an insert main body having a rake face and a flank face and a cutting edge which is formed at a ridge section between the rake face and the flank face in the insert main body.

According to the cutting insert of the present invention, even when cutting heat concentrates in the vicinity of the cutting edge on medium cutting of a difficult-to-cut material such as stainless steel, it is possible to prevent in advance such a situation that a point of the cutting edge undergoes plastic deformation to cause die wear, resulting in a failure of turning without causing an increase in cutting force or an increase in electric power for rotating and driving a workpiece.

DESCRIPTION OF REFERENCE NUMERALS

1: insert main body
2: rake face
3: flank face
5: cutting edge
6: corner section
7: linear section
10: inclination face
10A: first inclination face
10B: second inclination face
11: recessed portion
11A: bottom face of recessed portion 11
A: first region
B: second region
C: third region
L: bisector of corner section 6
M: extension line of linear section 7 to corner section 6
N: tangent line which is orthogonal to extension line M and in contact with corner section 6
P: border between third region C and first region A
Q: border between third region C and first region A
α: inclination angle of first inclination face 11A
β: inclination angle of second inclination face 11B
α1: inclination angle of first inclination face 11A in first region A and third region C
β1: inclination angle of second inclination face 11B in first region A and third region C
α2: inclination angle of first inclination face 11A in second region B
β2: inclination angle of second inclination face 11B in second region B

The invention claimed is:
1. A cutting insert comprising:
an insert main body which has a rake face and a flank face; and
a cutting edge which is formed at a ridge section between the rake face and the flank face in the insert main body, the cutting edge provided with a corner section which forms a convex arc shape when seen in a planar view from the direction facing the rake face and a linear section which is in contact with the corner section at an end of the corner section and extends linearly,
wherein
the insert main body is formed symmetrical with respect to a bisector of the corner section when seen in the planar view,
the cutting edge is provided with a first region along the corner section, a second region along the linear section, and a third region positioned between the first region and the second region along the linear section, when seen in the planar view, and
a cross-sectional area of the insert main body orthogonal to the cutting edge is largest in the third region among the first, the second and the third regions, and is smallest in the second region among the first, the second and the third regions, the cross-sectional area of the insert main body being within a distance equal to a radius R (mm) of the corner section in perpendicular to the cutting edge in the planar view, and
a border line between the second region and the third region in a planar view is positioned at where there is an increase in the cross-sectional area of the insert main body from the third region to the second region,
an inclination face which is inclined toward a face on a side opposite to the rake face of the insert main body with moving toward the inside of the rake face from the cutting edge on a cross-section orthogonal to the cutting edge is formed on the rake face from the first region, the second region to the third region, and an inclination angle of the inclination face in the third region is smaller than an inclination angle of at least in one of the first region and the second region.

2. The cutting insert according to claim 1, wherein
an inclination face which is inclined toward a face on a side opposite to the rake face of the insert main body with moving toward the inside of the rake face from the cutting edge on a cross-section orthogonal to the cutting edge is formed on the rake face from the first region, the second region to the third region, and a width of the inclination face in the third region is larger than a width of at least in one of the first region and the second region in a direction perpendicular to the cutting edge when seen in the planar view.

3. The cutting insert according to claim 1, wherein
another border line between the third region and the first region in the planar view is positioned at where there is a decrease in the cross-sectional area of the insert main body from the third region to the first region, and
the border line between the third region and the first region is positioned at a point located in a range of a distance of the radius R (mm) of the corner section plus 0.1 (mm) to the radius R (mm) plus 0.3 (mm) from an intersection between: an extension line of the linear section, to which the third region is connected; and a line, which touches the convex arc shape of the corner section and orthogonal to the extension line.

4. The cutting insert according to claim 1, wherein
another border line between the third region and the first region in the planar view is positioned at where there is a decrease in the cross-sectional area of the insert main body from the third region to the first region, the another border line between the third region and the first region is positioned at a point located in a range of a distance of the radius R (mm) of the corner section plus 0.1 (mm) from an intersection between: an extension line of the linear section, to which the third region is connected; and a line, which touches the convex arc shape of the corner section and orthogonal to the extension line, and the border line between the second region and the third region is positioned at a point located in a range of a distance of the nominal radius r (mm) of the corner section plus 0.3 (mm) from the intersection.

5. The cutting insert according to claim 1, wherein a recessed portion is formed inside the first region when seen in the planar view so as to dent with respect to the rake face communicating with the cutting edge in the first region and the third region, and a bottom face of the recessed portion is formed in a raised V-letter shape having a ridge section on the bisector on a cross-section orthogonal to the bisector of the corner section when seen in the planar view.

6. The cutting insert according to claim 1, wherein the border line between the second region and the third region in the planar view is positioned at a point located in a range of a distance of a nominal radius r (mm) of the corner section plus 0.6 (mm) from an intersection between: an extension line of the linear section, to which the third region is connected; and a line, which touches the convex arc shape of the corner section and orthogonal to the extension line.

\* \* \* \* \*